United States Patent Office 2,946,326
Patented July 26, 1960

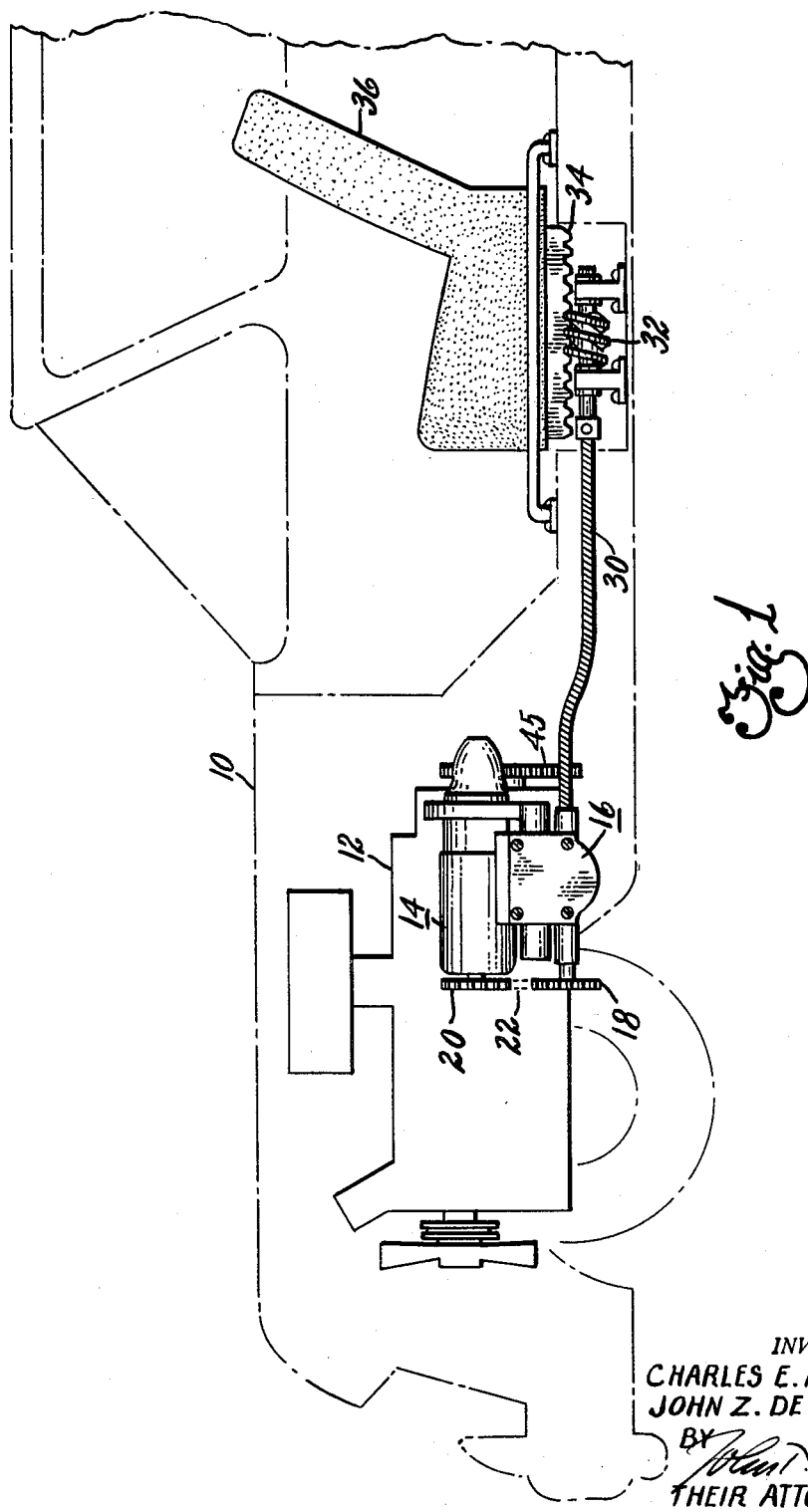

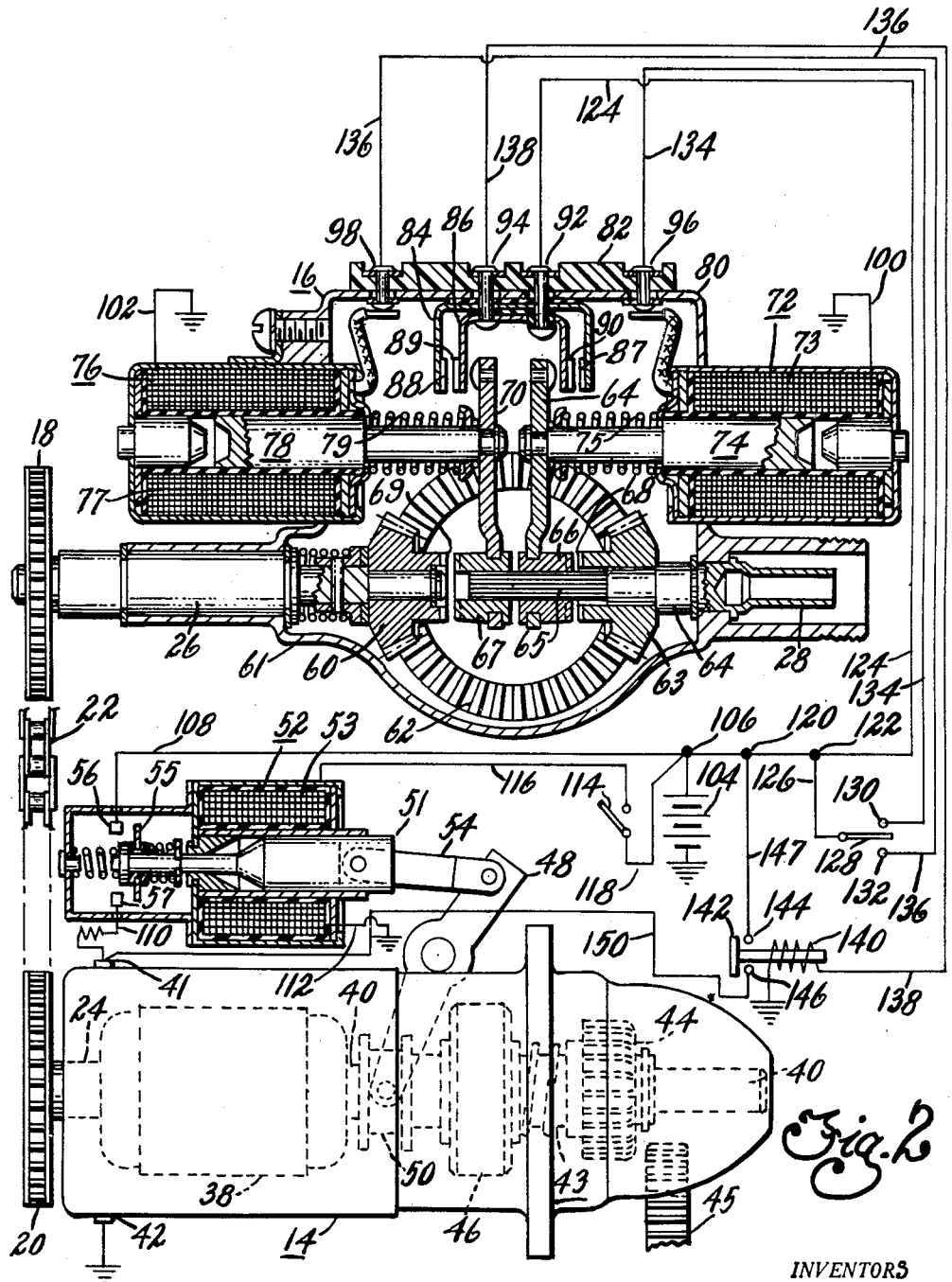

2,946,326

POWER DRIVE APPARATUS

Charles E. Bates, Anderson, Ind., and John Z. De Lorean, Birmingham, Mich., assignors to General Motors Corporation, Detroit, Mich., a corporation of Delaware Filed Mar. 4, 1959, Ser. No. 797,109

8 Claims. (Cl. 123—179)

This invention relates to an electric motor drive arrangement for motor vehicles and more particuarly to an arrangement wherein the electric starting motor of a motor vehicle is used as a source of power for driving movable parts of a motor vehicle such as the seat thereof.

In present-day motor vehicles, it has become common practice to provide for power operation of windows, seats and the like. In such devices, an electric or fluid motor must be provided as the source of power for driving the adjustable device, and this motor is in addition to the other power sources normally provided on the vehicle and as such, adds to the cost of the particular power option.

In contrast to this, it is an object of this invention to make use of the electric starting motor of a motor vehicle as the source of power for driving adjustable or movable parts of the vehicle such as the seat thereof. With this arrangement, a separate source of power for adjusting the seat or other movable device is not required as the starting motor performs this function. The starting motor is well adapted for this function as it is rugged in operation and exhibits high torque.

Another object of this invention is to provide a drive for a movable or adjustable part of a motor vehicle that includes the starting motor as a source of power and wherein the pinion that is driven by the starting motor is prevented from meshing with the ring gear of the engine when power is being supplied to operate or adjust a movable part of the motor vehicle.

Still another object of this invention is to provide a bi-directional drive for adjusting a movable part of a motor vehicle, the drive including the electric starting motor of the vehicle and a pair of clutches that are caused to become engaged by a pair of solenoids whenever it is desired to adjust a moving part of the vehicle such as a seat.

Further objects and advantages of the present invention will be apparent from the following description, reference being had to the accompanying drawings wherein a preferred form of the invention is clearly shown.

In the drawings:

Figure 1 is a side view showing a motor vehicle that is provided with the bi-directional drive of this invention.

Figure 2 is a plan view illustrating the electrical and mechanical connections between the starting motor and the power transmission unit of this invention.

Referring now to the drawings and more particularly to Figure 1, an outline of a motor vehicle is shown in phantom lines and the vehicle is designated by reference numeral 10. The motor vehicle has a motor compartment that contains the usual internal combustion engine 12. The engine is fitted with a starter assembly generally designated by reference numeral 14 and including an electric starting motor and a shiftable pinion gear. The starter 14 carrries a transmission designated in its entirety by reference numeral 16. The transmission is connected with the armature of the starting motor of starter 14 through gears 18 and 20 and chain 22. The gear 20 is connected with the armature shaft 24 as is clearly evident from Figure 2, whereas the gear 18 is connected with the input shaft 26 of transmission 16. The output shaft 28 of transmission 16 is connected with a flexible drive member 30 which drives a worm gear 32. The worm gear 32 drives a rack 34 which is connected with the seat 36 of the automobile or motor vehicle. It will be readily apparent that when the worm gear 32 is rotated in one direction, the seat 36 is moved in a given direction and when the worm gear rotates in an opposite direction, the seat likewise moves in an opposite direction. It is to be appreciated that the flexible cable 30 might be used to drive movable parts of a motor vehicle other than the seat 36 and that the flexible cable 30 might also be used to adjust the seat in different directions than that illustrated in the drawing where different seat actuating devices are provided.

Referring now to Figure 2, it is seen that the starter 14 includes the usual rotatable armature 38 connected to drive shaft 24 having a portion 40 extending rightwardly of the armature. The starting motor will contain the usual field windings, not shown, and the shaft 24 is fitted with a commutator, not shown, that receives electrical energy from terminals 41 and 42, the terminal 42 being connected directly to ground as shown. The shaft extension 40 carries a drive assembly 43 including a pinion gear 44 which is adapted to be shifted into mesh with the ring gear 45 of engine 12. The drive assembly may be of the type illustrated in copending application Serial Number 527,722 filed August 11, 1955. The pinion gear 44 is driven from shaft 24 in a conventional manner through an overrunning clutch designated by reference numeral 46. The overrunning clutch 46 and pinion gear 44 are slidable on shaft 40 and are moved by a lever 48 that is connected with sleeve 50. The connection between lever 48 and sleeve 50 is such that the sleeve is shifted by the lever 48 but may rotate relative to the lower end of lever 48, all of which is conventional starting motor practice.

The lever 48 is connected with the armature 51 of a solenoid designated by reference numeral 52 and having an actuating coil 53. The armature 51 and the lever 48 are connected by means of link 54 and the armature 51 is connected with a movable contactor 55 that shorts contacts 56 and 57 whenever the solenoid coil 53 is energized to shift the pinion gear 44 into mesh with the ring gear. Thus, it will be apparent that whenever solenoid 53 is energized, the contacts 56 and 57 are shorted at the time that the pinion 44 is driven into mesh with ring gear 45. As will become more readily apparent hereinafter, the shorting of contacts 56 and 57 completes a circuit for the starting motor so that the engine is cranked when the pinion gear 44 meshes with the ring gear 45. The particular starting motor apparatus described heretofore is entirely conventional.

The transmission for transmitting power from the electric starting motor to the adjusting mechanism includes the input shaft 26 which is connected with a bevel gear 60 located within housing 61. The housing 61 supports a ring gear 62 that is rotatable within the housing and which meshes with bevel gear 60. A second bevel gear 63 is splined or otherwise secured to shaft 64 that is connected with output shaft 28. The shaft 64 has a splined portion 65 which carries clutch members 66 and 67. The clutch members 66 and 67 are splined to the splined portion 65 and are slidable thereon. The clutch member 66 has teeth which are adapted to engage complementary teeth on the end face 68 of bevel gear 63. In a like manner, the clutch segment 67 has teeth which engage complementary teeth on the end face 69 of bevel gear 60.

It will be appreciated that any other type of clutch arrangement might be provided, it only being important that the clutch members 66 and 67 be driven by the bevel gears 63 and 60 when they are shifted into engagement with a respective gear.

The clutch member 66 is shifted into engagement with the end of bevel gear 63 by an arm 64 which fits over the clutch member 66 in such a manner that the clutch member is rotatable within the lower portion of the arm 64. In a like manner, the clutch member 67 is shifted into engagement with bevel gear 60 by an arm 70 which has an opening that receives clutch member 67 and which permits rotation of the clutch member within the lower portion of the arm 70.

The arm 64 is operated by a solenoid designated in its entirety by reference numeral 72 and including an actuating coil winding 73 and a shiftable armature 74. The armature 74 is connected with the arm 64 and the arm is biased to hold the clutch member 66 disengaged from bevel gear 63 by means of a spring 75. In a like manner, the arm 70 is shifted by a solenoid 76 having an actuating coil winding 77 and a movable armature 78. A spring 79 biases the arm 70 into a position wherein the clutch member 67 is maintained normally disengaged from the gear 60. It will be appreciated that when coil winding 73 is energized, the armature 74 will be attracted to shift clutch member 66 into engagement with bevel gear 63 against the force of spring 75. In a like manner, whenever solenoid 76 is energized, the clutch member 67 is moved into clutching engagement with bevel gear 60.

The transmission 16 has an upper housing 80 which carries an insulator block 82 and two U-shaped strap metal conductors 84 and 86. The metal strap conductor 84 is formed of spring metal material and carries contacts 87 and 88. In a like manner, the U-shaped metal strap 86 is formed of spring metal material and carries contacts 89 and 90. The metal strap conductors 84 and 86 are suitably insulated from each other as shown and are held in position by electrical conducting rivets 92 and 94. The rivet 94 is electrically connected with strap connector 86 and is insulated from strap connector 84, whereas the rivet 92 is electrically connected with strap connector 84 but is electrically insulated from strap connector 86. The insulator block 82 also carries rivets 96 and 98 which are connected to one side of actuating coils 73 and 77. The opposite side of actuating coil 73 is connected to ground by a lead 100, whereas the opposite side of actuating coil 77 is connected to ground via a lead 102.

It can be seen from Figure 2 that the electrical system for energizing the starting motor and transmission 16 includes the usual storage battery 104 which has one side thereof grounded and which has an opposite side connected with junction 106. The junction 106 is connected with terminal 56 of the switch that controls energization of the starting motor via a lead 108. The other contact 57 that controls the sarting motor is connected with terminal 41 of the starting motor via a lead 110. The actuating coil 53 of the shifting solenoid has one side thereof grounded via lead 112 and has an opposite side thereof connected to one side of a switch 114 via lead 116. The opposite side of switch 114 is connected with junction 106 via a lead 118.

The junction 106 is connected with junctions 120 and 122 as is clearly evident from Figure 2. The junction 122 is connected with lead wire 124 which is, in turn, connected with the rivet 92 of transmission 16. The junction 122 is also connected with a lead 126 that is connected with a manually movable contactor 128 adapted to engage either contact 130 or contact 132. The contact 130 is connected with lead wire 134 which is, in turn, connected with rivet 96 of transmission 16. The contact 132 is connected with lead wire 136 which is connected with rivet 98 of transmission 16. The rivet 94 of transmission 16 is connected with a lead wire 138 which is connected to one side of a relay actuating coil 140. The opposite side of relay actuating coil 140 is connected directly to ground and whenever the actuating coil 140 is energized, the movable contactor 142 is shifted into engagement with contacts 144 and 146. When the relay coil 140 is de-energized, the contactor 142 is maintained out of contact with contacts 144 and 146 by a suitable spring or any other means. The contact 144 is connected with junction 120 via lead 147, whereas the contact 146 is connected with the terminal 41 of the starting motor via lead 150.

In operation, if it is desired to crank the engine of the motor vehicle, the switch 114 is manually closed to complete an energizing circuit for actuating coil 53 via leads 118 and 116. When the actuating coil 53 is energized, the armature 51 is shifted and operates through lever 48 and sleeve 50 to shift the pinion gear 44 into mesh with ring gear 45. As the pinion shifts into mesh with ring gear 45, the contacts 56 and 57 are shorted by contactor 55 to complete a circuit for the starting motor that may be trcaed from junction 106, through lead wire 108, through contactor 55, through lead 110 and thence from terminal 41 through the starting motor. This will cause cranking of the engine as long as switch 114 is maintained closed. It will be appreciated that this cranking of the engine will not in any way affect the electric circuitry of transmission 16 and consequently, the seat 36 can in no way be adjusted during cranking of the engine.

If it is desired to adjust the seat 36 in one direction or the other, the contactor 128 is manually shifted to engage either contact 130 or contact 132. Assuming that the contactor 128 is moved into engagement with contact 130, a circuit is completed for actuating coil 73 of the transmission that may be traced from terminal 122, through contactor 128, through lead wire 134, through rivet 96 and through the actuating coil 73 to ground. The energization of relay coil 73 causes the clutch member 66 to be shifted into clutching engagement with bevel gear 63. As the arm 64 is being shifted, the top end of the rod moves contact 90 into engagement with contact 87. The closure of contacts 90 and 87 connects lead wires 124 and 138 together. When lead wires 124 and 138 are connected together, a circuit is completed for relay actuating coil 140 that may be traced from junction 122, through lead 124, through contacts 90 and 87, through lead 138 and thence through the actuating coil 140 to ground. With actuating coil 140 energized, the contactor 142 shorts contacts 144 and 146 to complete a circuit for the electric starting motor that may be traced from junction 120, through lead 147, through contactor 142, through lead wire 150 and thence from terminal 41 through the starting motor to ground.

With the starting motor energized from contacts 144 and 146, the solenoid coil 53 is, of course, not energized so that pinion gear 44 is not shifted into mesh with the ring gear 45. The starting motor will then drive the input shaft 26 of transmission 16 through gears 18 and 20 and chain 22. With shaft 26 being driven by the starting motor, the ring rear 62 is rotated by the bevel gear 60 which is directly driven from shaft 26. With the ring gear 62 being driven by bevel gear 60, the bevel gear 63 is driven in an opposite direction from the rotation of bevel gear 60 and since the bevel gear 63 is now clutched to clutch member 66, the shaft 28 will be driven by clutch member 66. In other words, the drive for shaft 28 is now from shaft 26, through bevel gear 60, through ring gear 62, through bevel gear 63 and thence from clutch member 66 to the shaft 28.

If the movable contactor 128 had been shifted to engage contactor 132, the solenoid actuating coil 77 of the transmission would have been energized to cause a closure of switch contacts 88 and 89 and to cause the clutch member 67 to become engaged with bevel gear 60. In this mode of operation, the shaft 28 would be driven from shaft 26 through bevel gear 60 and thence through clutch member 67 to the splined portion 65 of shaft 64 that is connected with shaft 28. It will be apparent that the rotation of the shaft 28 will now be opposite from that which occurred when movable contactor 28 was in engagement with contact 130.

From the foregoing, it will be clearly apparent that movement of the movable contactor 128 into engagement with contacts 130 and 132 causes the shaft 128 to be driven in one of two directions by the starter 14. It will also be apparent that the engine will not be cranked whenever it is desired to adjust the seat 36 by movement of contactor 128. Moreover, when the engine is being cranked under the control of switch 114, the electric circuitry of transmission 16 remains deenergized so that the seat or other movable part of the vehicle is not in any way adjusted.

While the embodiments of the present invention as herein disclosed constitute preferred forms, it is to be understood that other forms might be adopted.

What is claimed is as follows:

1. In combination, a motor vehicle having an engine, an electric starting motor, power transmitting means for connecting said electric starting motor with said engine to crank the same, means controlling the connection of said starting motor with said engine, a transmission, said transmission having an input shaft connected with said motor and having an output shaft, a pair of solenoids controlling the operation of said transmission and energization of said starting motor, and means shiftable by said solenoids for connecting the input shaft of said transmission with the output shaft thereof and for controlling the direction of rotation of said output shaft.

2. In combination, a motor vehicle having an engine, an electric starting motor, power transmitting means connected between said electric starting motor and said engine for controlling the cranking of said engine by said starting motor, a transmission having an input shaft, second power transmitting means connecting said electric motor with the input shaft of said transmission, a first bevel gear connected with the input shaft of said transmission, a ring gear driven by said bevel gear, a second bevel gear meshing with said ring gear, an output shaft connectable with said second bevel gear, a pair of clutch members slidable on said output shaft and connected to rotate therewith, a pair of solenoids, each of which is connected with a respective clutch member for shifting the clutch member into engagement with a respective bevel gear, switch means operable by said solenoids controlling the energization of said starting motor, means for disabling the power transmitting means connecting said starting motor and engine, and means controlling the energization of said solenoids.

3. In combination, a motor vehicle having an engine, an electric starting motor, first power transmitting means for at times connecting said electric starting motor with said engine for cranking said engine, second bi-directional power transmitting means including a pair of clutch means operatively connected with said electric starting motor and having an output shaft, a seat mounted for movement in said motor vehicle, adjustable means for causing adjusting movement of said seat in two directions, means connecting the output shaft of second power transmitting means with said adjustable means, and means for causing one of said power transmitting means to be effective to the exclusion of the other.

4. In combination, a motor vehicle having an engine, an electric starting motor, first power transmitting means adapted to connect said electric starting motor and said engine for cranking said engine, first electrical energizable means for controlling said first power transmitting means, a first electrical switch connected between a source of power and said first electrically energizable means for controlling the cranking of said engine, an adjustable device mounted on said motor vehicle, second bi-directional power transmitting means connected between said electric motor and said adjustable device, second electrically energizable means for controlling the operation of said second power transmitting means, an electric switch having two positions adapted to connect said second electrically energizable means with a source of power, and means including a shunt circuit bypassing said first electrical energizable means and said first electrical switch for causing energization of said starting motor when said two-position switch is shifted to one of its two positions.

5. In combination, a motor vehicle having an engine, an electric starting motor, first electrically energizable means for connecting said starting motor with a source of power and for causing mechanical connection of said starting motor with said engine, second electrically energizable means for causing said starting motor to be energized from said source of power and for causing said starting motor to be mechanically connected with an adjustable device mounted on said motor vehicle, first switch means for electrically connecting said first electrically energizable means with said source of power, and second switch means for causing said second electrically energizable means to be connected with said source of power.

6. In combination, a motor vehicle having an engine, an electric starting motor, an adjustable device on said vehicle, a power source, bi-directional transmission means connected between said starting motor and said adjustable device, first electrically energizable means controlling the connection of said starting motor with said engine and controlling the energization of said starting motor from said power source, second electrically energizable means controlling said transmission, and a circuit controlled by said second electrically energizable means for energizing said starting motor.

7. In combination, a motor vehicle having an engine, an electric starting motor, an adjustable device on said vehicle, bi-directional power transmitting means connected between said starting motor and said adjustable device, a solenoid operative when energized to cause said starting motor to be connected to said engine for cranking said engine, a switch operated by said solenoid for completing a first energizing circuit for said starting motor when said solenoid is energized, and a second energizing circuit for said starting motor bypassing said solenoid and switch.

8. In combination, a motor vehicle having an engine, an electric starting motor, an adjustable device on said vehicle, bi-directional power transmitting means connected between said starting motor and said adjustable device, an electrically energizable device operative to cause said starting motor to be connected to said engine and operative to complete a first energizing circuit for said motor, and a second energizing circuit for said motor bypassing said first energizing circuit and said electrically energizable means.

References Cited in the file of this patent

UNITED STATES PATENTS

| | | |
|---|---|---|
| 2,248,379 | Parsons | July 8, 1941 |
| 2,784,610 | Block | Mar. 12, 1957 |